(12) United States Patent
Asai et al.

(10) Patent No.: US 10,920,834 B2
(45) Date of Patent: Feb. 16, 2021

(54) ENGAGEMENT-TYPE CLUTCH MECHANISM

(71) Applicant: MUSASHI SEIMITSU INDUSTRY CO., LTD., Toyohashi (JP)

(72) Inventors: Ryosuke Asai, Toyohashi (JP); Takahisa Tanaka, Toyohashi (JP); Yoshihiro Yoshida, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 16/497,961

(22) PCT Filed: Mar. 6, 2018

(86) PCT No.: PCT/JP2018/008579
§ 371 (c)(1),
(2) Date: Sep. 26, 2019

(87) PCT Pub. No.: WO2018/180283
PCT Pub. Date: Oct. 4, 2018

(65) Prior Publication Data
US 2020/0318692 A1    Oct. 8, 2020

(30) Foreign Application Priority Data
Mar. 29, 2017    (JP) .................................. 2017-066228

(51) Int. Cl.
*F16D 11/10*    (2006.01)
*F16D 23/02*    (2006.01)
(Continued)

(52) U.S. Cl.
CPC ............ *F16D 11/10* (2013.01); *F16D 23/025* (2013.01); *F16D 23/06* (2013.01);
(Continued)

(58) Field of Classification Search
None
See application file for complete search history.

(56) References Cited

U.S. PATENT DOCUMENTS

| 2,981,390 A | * | 4/1961 | Doerper | .................. F16D 23/06 |
| | | | | 192/69.9 |
| 5,096,037 A | * | 3/1992 | Knoess | ..................... B22F 5/08 |
| | | | | 192/108 |

(Continued)

FOREIGN PATENT DOCUMENTS

| CN | 103133554 A | 6/2013 |
| CN | 104315040 A | 1/2015 |

(Continued)

OTHER PUBLICATIONS

Official Communication dated May 28, 2020 issued to the corresponding Chinese Patent Application 2018800221165.5.

(Continued)

*Primary Examiner* — Colby M Hansen
(74) *Attorney, Agent, or Firm* — Carrier Blackman & Associates, P.C.; Joseph P. Carrier; William D. Blackman

(57) ABSTRACT

An engagement-type clutch mechanism is provided in which due to the movement of a first power transmission member, which is movably supported on a rotating shaft, toward a second power transmission member, a first and second projecting parts provided on opposing faces of a first and second power transmission members are engaged to each other, and the rotation of the second power transmission member is synchronized with the rotation of the first power transmission member, and due to the movement of a sleeve toward the synchronized second power transmission member, a first spline of the first power transmission member is linked to a second spline of the second power transmission member via a to-be-engaged spline of the sleeve, and the rotation of one of the rotating shaft and the second power (Continued)

transmission member is transmitted to the other of the rotating shaft and the second power transmission member.

8 Claims, 4 Drawing Sheets

(51) Int. Cl.
*F16D 23/06* (2006.01)
*F16D 11/00* (2006.01)
*F16H 63/30* (2006.01)

(52) U.S. Cl.
CPC .. *F16D 2011/002* (2013.01); *F16D 2011/008* (2013.01); *F16D 2023/0656* (2013.01); *F16D 2500/10462* (2013.01); *F16H 2063/3093* (2013.01)

(56) References Cited

U.S. PATENT DOCUMENTS

| | | | |
|---|---|---|---|
| 6,419,063 | B1 | 7/2002 | Smith |
| 7,806,247 | B2 * | 10/2010 | Lundberg ................ F16D 23/06 |
| | | | 192/114 T |
| 9,970,489 | B2 | 5/2018 | Murata |
| 2003/0116397 | A1 * | 6/2003 | Ima ........................ F16D 23/06 |
| | | | 192/48.91 |
| 2006/0049018 | A1 * | 3/2006 | Legner .................... F16D 23/06 |
| | | | 192/53.34 |
| 2015/0068862 | A1 * | 3/2015 | Fujii ....................... F16D 11/14 |
| | | | 192/84.9 |
| 2016/0146269 | A1 | 5/2016 | Tanaka et al. |

FOREIGN PATENT DOCUMENTS

| | | |
|---|---|---|
| CN | 105020290 A | 11/2015 |
| CN | 105697577 A | 6/2016 |
| EP | 1 321 689 A1 | 6/2003 |
| JP | S54-31847 A | 3/1979 |
| JP | H05-172155 A | 7/1993 |
| JP | H08-219173 A | 8/1996 |
| JP | 2009-108878 A | 5/2009 |
| JP | 2010-096190 A | 4/2010 |
| JP | 2014-055628 A | 3/2014 |

OTHER PUBLICATIONS

Official Communication (Decision of Granting a Patent) dated Sep. 2, 2020, issued in the corresponding JP Patent Application No. 2017-066228.

Official Communication (Notice of Allowance) issued over the corresponding Chinese Patent Application No. 201880022165.5.

* cited by examiner

ENGAGEMENT-TYPE CLUTCH MECHANISM

TECHNICAL FIELD

The present invention relates to an improvement of an engagement-type clutch mechanism that is used in a transmission, etc. and disconnectably/connectably transmits rotation of one of a rotating shaft and a power transmission member relatively rotatably supported on the rotating shaft to the other of the rotating shaft and the power transmission member.

BACKGROUND ART

As such an engagement-type clutch mechanism, the arrangement disclosed in Patent Document 1 below is already known.

The arrangement of Patent Document 1 includes a clutch ring relatively rotatably supported on a rotating shaft, a clutch hub relatively non-rotatably fixed to the rotating shaft so as to be adjacent to the clutch ring and having spline teeth formed on its outer peripheral face, a sleeve having inner teeth meshing with the spline teeth of the clutch hub and axially movably disposed on the outer peripheral face of the clutch hub, and clutch teeth provided on the clutch ring so as to project toward the sleeve and disengageably meshing with the inner teeth, the inner teeth having stub teeth and full depth teeth, the clutch teeth having front teeth that can mesh with the full depth teeth but cannot mesh with the stub teeth and rear teeth that are positioned so as to be set back further than the front teeth and can mesh with the stub teeth, movement of the sleeve toward the clutch ring side engaging the full depth teeth with the front teeth, rotation of the clutch ring being synchronized with rotation of the clutch hub and the rotating shaft, and movement of the sleeve further toward the synchronized clutch ring side allowing the stub teeth and the rear teeth to mesh with each other.

RELATED ART DOCUMENTS

Patent Documents

Patent Document 1: Japanese Patent Application Laid-open No. 2010-96190

SUMMARY OF THE INVENTION

Problems to be Solved by the Invention

Since the engagement-type clutch mechanism disclosed in Patent Document 1 above is arranged so that the full depth teeth of the sleeve are first engaged with the front teeth of the clutch teeth due to movement of the sleeve toward the clutch ring side, rotation of the clutch ring is thus synchronized with rotation of the clutch hub, the stub teeth of the sleeve are meshed smoothly with the rear teeth of the clutch teeth by movement of the sleeve further toward the clutch ring side, and rotation of one of the rotating shaft and the clutch ring is thereby transmitted to the other of the rotating shaft and the clutch ring via the clutch hub and the sleeve, it is possible to obtain smooth meshing of the clutch mechanism. However, since the full depth teeth for synchronization and the stub teeth for power transmission have to be formed on both the spline teeth of the clutch hub and the inner teeth of the sleeve, and the front teeth meshing only with the full depth teeth and the rear teeth disposed at a position set back further than the front teeth have to be formed on a side face, on the sleeve side, of the clutch ring, not only does machining become complicated to thus cause an increase in the number of steps and an increase in the cost, but it is also difficult to carry out optimum design for synchronization and power transmission due to restrictions on the number of teeth and the shape.

The present invention has been accomplished in light of such circumstances, and it is an object thereof to obtain an engagement-type clutch mechanism that is easily machined and is less likely to be affected by restrictions in terms of the number of teeth and the shape while ensuring smooth meshing of a clutch mechanism.

Means for Solving the Problems

In order to attain the above object, according to a first aspect of the present invention, there is provided an engagement-type clutch mechanism comprising a first power transmission member supported on a rotating shaft so as to be capable of rotating integrally with the rotating shaft and moving in a direction of an axis of the rotating shaft, a second power transmission member supported on the rotating shaft adjacently to the first power transmission member so as to be capable of rotating relative to the rotating shaft and incapable of moving in the direction of the axis, a first projecting part provided on a face of the first power transmission member that opposes the second power transmission member, a first spline provided on an outer peripheral face of the first power transmission member, a second projecting part provided on a face of the second power transmission member that opposes the first power transmission member and being capable of engaging with the first projecting part, a second spline provided on an outer peripheral face of the second power transmission member, and a sleeve having on an inner peripheral face a to-be-engaged spline that can engage with each of the first spline and the second spline, and disposed so as to be capable of moving in the direction of the axis, when viewed in a peripheral direction of opposing faces of the first and second power transmission members, a ratio of a length of a portion between the first and second projecting parts to a width thereof being larger than a ratio of a length of a portion between teeth of each of the first and second splines relative to a tooth thickness, movement of the first power transmission member toward the second power transmission member side engaging the first projecting part with the second projecting part and making rotation of the second power transmission member be synchronized with rotation of the first power transmission member, engagement of the sleeve with the synchronized first power transmission member and second power transmission member linking the first spline and the second spline via the to-be-engaged spline, and rotation of one of the rotating shaft and the second power transmission member being transmitted to the other of the rotating shaft and the second power transmission member.

Further, according to a second aspect of the present invention, in addition to the first aspect, a phase at which the first spline and the second spline are linked via the to-be-engaged spline and a phase at which the first projecting part and the second projecting part are engaged are different from each other.

Furthermore, according to a third aspect of the present invention, in addition to the first or second aspect, a recessed portion is formed in one of the opposing faces of the first and second power transmission members, one of the first and second projecting parts corresponding to the power transmission member is formed on an inner face of the recessed portion, and the other of the first and second projecting parts is formed on the other of the opposing faces so as to project toward the recessed portion side.

Moreover, according to a fourth aspect of the present invention, in addition to any one of the first to third aspects, the engagement-type clutch mechanism comprises movement control means that can individually move the first power transmission member and the sleeve.

In addition, first and second dogs 7 and 9 of an embodiment correspond to the first and second projecting parts of the present invention, and similarly first and second peripheral grooves 4b and 12a and two sets of forks and actuators, which are not illustrated, engaging therewith of the embodiment correspond to the movement control means of the present invention.

Effects of the Invention

In accordance with the first aspect of the present invention, since when viewed in the peripheral direction of the opposing faces of the first and second power transmission members, the ratio of the length of a portion between the first and second projecting parts relative to the width thereof is larger than the ratio of the length of a portion between the teeth of the first and second splines relative to the tooth thickness, when the first power transmission member is moved toward the second power transmission member side, one of the first and second projecting parts can easily be made to enter the region between the other of the projecting parts, the first dog can therefore easily be engaged with the second dog, and the rotation of the second power transmission member can easily be synchronized with the rotation of the first power transmission member. Furthermore, since after the rotations of the first and second power transmission members are synchronized, the to-be-engaged spline of the sleeve can be easily engaged with the second spline of the second power transmission member, the first spline and the second spline can be linked smoothly via the to-be-engaged spline due to the movement of the sleeve, and smooth meshing of the engagement-type clutch mechanism can be obtained.

Furthermore, since the dogs for synchronization and the splines for power transmission are provided at separate positions, when designing them, the placement thereof does not impose any restrictions on one another, and the degree of freedom in design can be enhanced.

Moreover, in accordance with the second aspect of the present invention, since the phase at which the first spline and the second spline are linked via the to-be-engaged spline and the phase at which the first dog and the second dog are engaged are made different from each other, when the first spline and the second spline are linked via the to-be-engaged spline, the first projecting part and the second projecting part can be spaced from each other in the peripheral direction. Because of this, since it is possible to prevent the power between the first and second power transmission members from being transmitted to the first and second projecting parts, it is unnecessary to particularly enhance the strength of the teeth of the first and second projecting parts, and the degree of freedom in design can be enhanced.

Furthermore, when the sleeve is moved away from the second power transmission member to thus release the link between the first and second power transmission members, since the first projecting part and the second projecting part are not in contact with each other, it is possible to quickly move the sleeve back and enhance the responsiveness at the time of release.

Moreover, in accordance with the third aspect of the present invention, since the recessed portion is formed in one of the opposing faces of the first and second power transmission members, one of the first and second projecting parts corresponding to the power transmission member is formed on the inner face of the recessed portion, and the other of the first and second projecting parts is formed on the other of the opposing faces so as to project toward the recessed portion side, the first and second projecting parts are engaged within the recessed portion, thus enabling the dimension of the engagement-type clutch mechanism in the axial direction to be reduced.

Furthermore, in accordance with the fourth aspect of the present invention, since it includes the movement control means that can individually move the first power transmission member and the sleeve, it is possible to carry out control so that the timing with which the first power transmission member is moved toward the second power transmission member side and the rotations of the two are synchronized and the timing with which the sleeve is moved toward the second power transmission member side and the to-be-engaged spline and the second spline are engaged are variously changed and so that the speeds of movement of the first power transmission member and the sleeve are changed according to circumstances.

EXPLANATION OF REFERENCE NUMERALS AND SYMBOLS

Figure 1:
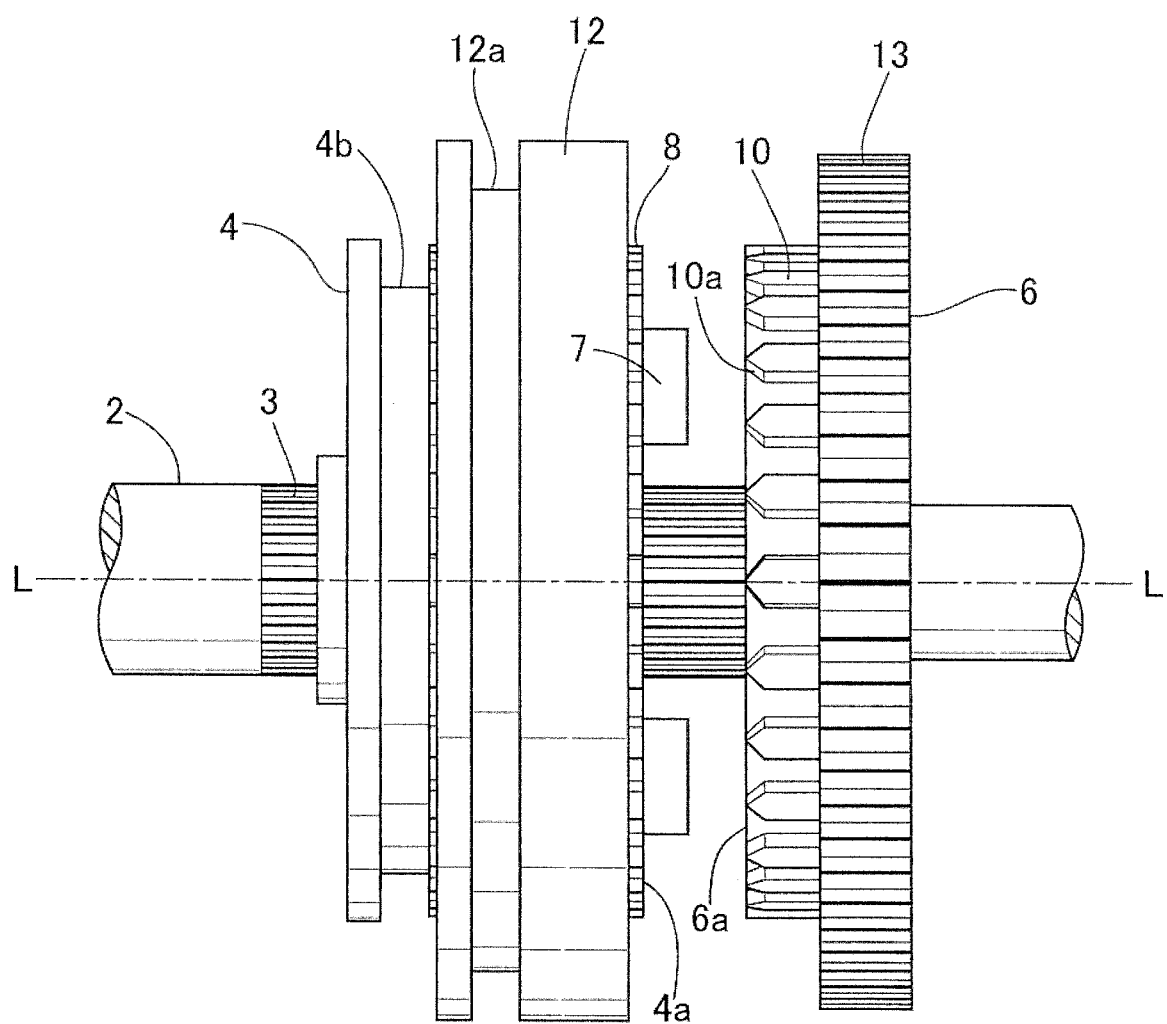
FIG. 1 is a side view of an engagement-type clutch mechanism in a non-connected state in one embodiment of the present invention. (first embodiment)

L Axis of rotating shaft
2 Rotating shaft
4 First power transmission member
4a Face of first power transmission member opposing second power transmission member
4b Movement control means (first peripheral groove)
6 Second power transmission member
6a Face of second power transmission member opposing first power transmission member
6b Recessed portion
7 First projecting part (first dog)
8 First spline
9 Second projecting part (second dog)
10 Second spline
11 To-be-engaged spline 12 Sleeve
12a Movement control means (second peripheral groove)

MODES FOR CARRYING OUT THE INVENTION

An embodiment of the present invention is explained below by reference to the attached drawings.

First Embodiment

Figure 2:
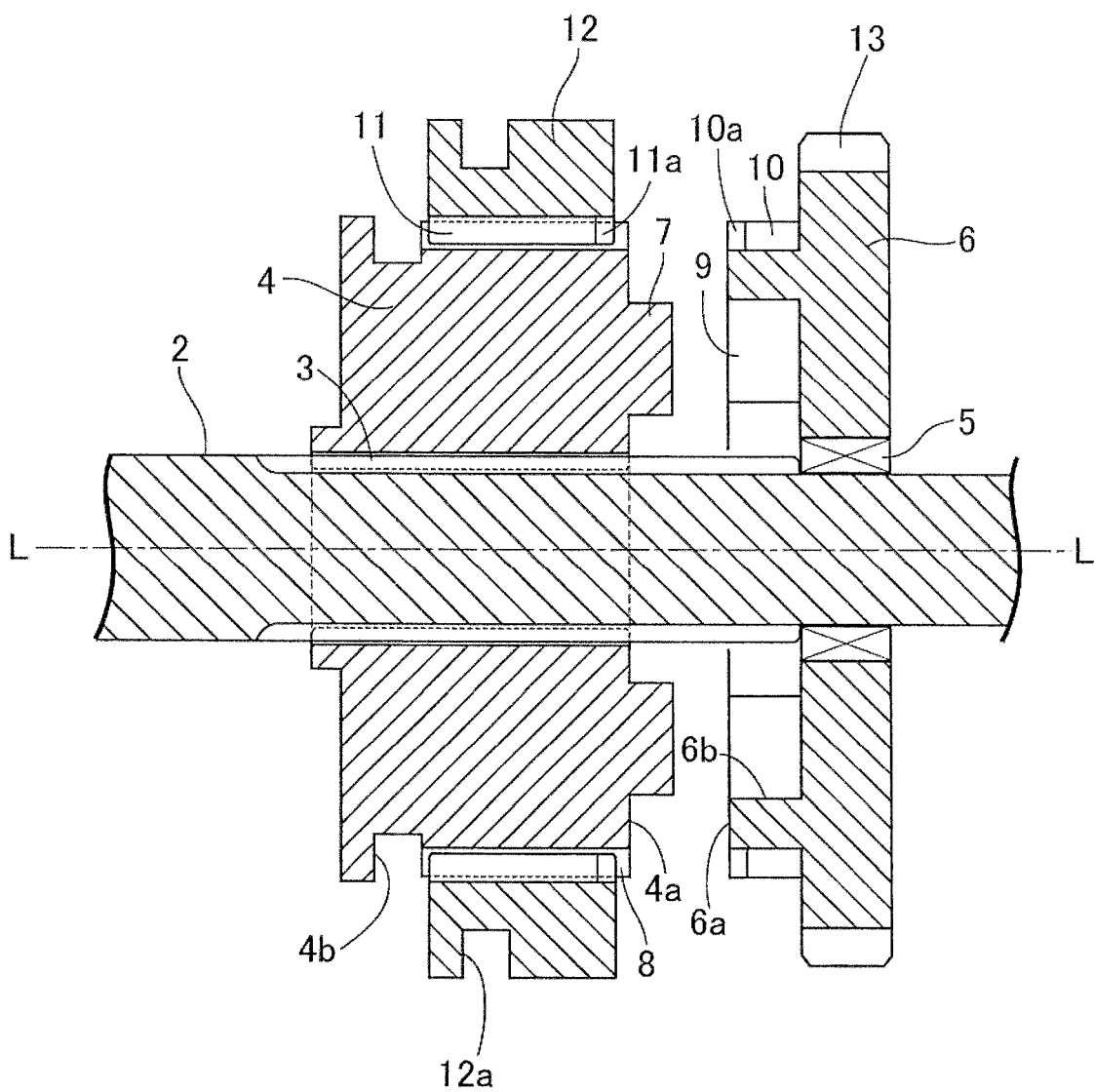
FIG. 2 is a vertical sectional view of the engagement-type clutch mechanism of FIG. 1 in a non-connected state. (first embodiment)

As shown in FIG. 1 and FIG. 2, an engagement-type clutch mechanism 1 of the present embodiment includes a rotating shaft 2 connected to a power source, which is not illustrated, a first power transmission member 4 joined to the outer periphery of the rotating shaft 2 by means of a spline 3 so that it can rotate integrally with the rotating shaft 2 and can move in the direction of an axis L of the rotating shaft 2, a second power transmission member 6 supported via a bearing 5 on the outer periphery of the rotating shaft 2 at a position adjacent to the first power transmission member 4 so that it can rotate relative to the rotating shaft 2 but cannot move in the axis L direction of the rotating shaft 2, a first dog 7 as a first projecting part provided on a face 4a of the first power transmission member 4 that opposes the second power transmission member 6, a first spline 8 provided on an outer peripheral face of the first power transmission member 4, a second dog 9 as a second projecting part provided on a face 6a of the second power transmission member 6 that opposes the first power transmission member 4 and capable of engaging with the first dog 7, a second spline 10 provided on an outer peripheral face of the second power transmission member 6, and a sleeve 12 having on an inner peripheral face a to-be-engaged spline 11 that can engage with each of the first spline 8 and the second spline 10 and being disposed on the outer periphery of the first power transmission member 4 so that it can move in the axis L direction. The arrangement is such that movement of the first power transmission member 4 toward the second power transmission member 6 side engages the first dog 7 with the second dog 9 and synchronizes rotation of the second power transmission member 6 with rotation of the first power transmission member 4, and movement of the sleeve 12 toward the synchronized second power transmission member 6 side links the first spline 8 and the second spline 10 via the to-be-engaged spline 11 and transmits rotation of the rotating shaft 2 to the second power transmission member 6. Furthermore, outer teeth 13 for transmitting, to the outside, power of the rotating shaft 2 that has been transmitted to the second power transmission member 6 are formed on an outer peripheral face of the second power transmission member 6 separately from the second spline 10.

In order to move the first power transmission member 4 and the sleeve 12 respectively toward the second power transmission member 6 side, a first peripheral groove 4b and a second peripheral groove 12a are formed in the outer periphery of the first power transmission member 4 and the outer periphery of the sleeve 12 respectively so as to go around them once in the peripheral direction, and forks for moving the first power transmission member 4 and the sleeve 12 in the axis L direction of the rotating shaft 2 engage with the first and second peripheral grooves 4b and 12a respectively. Each fork has connected thereto an actuator for individually driving it, illustration of the fork and the actuator being omitted.

A mechanism for moving the first power transmission member 4 and the sleeve 12 toward the second power transmission member 6 side is not limited to one in which two pairs of actuators and forks engaging with the first and second peripheral grooves 4b and 12a are used and, for example, it is possible to employ an arrangement in which the first power transmission member 4 and the sleeve 12 are linked by a coupling mechanism and they are driven by a single actuator.

Figure 3:
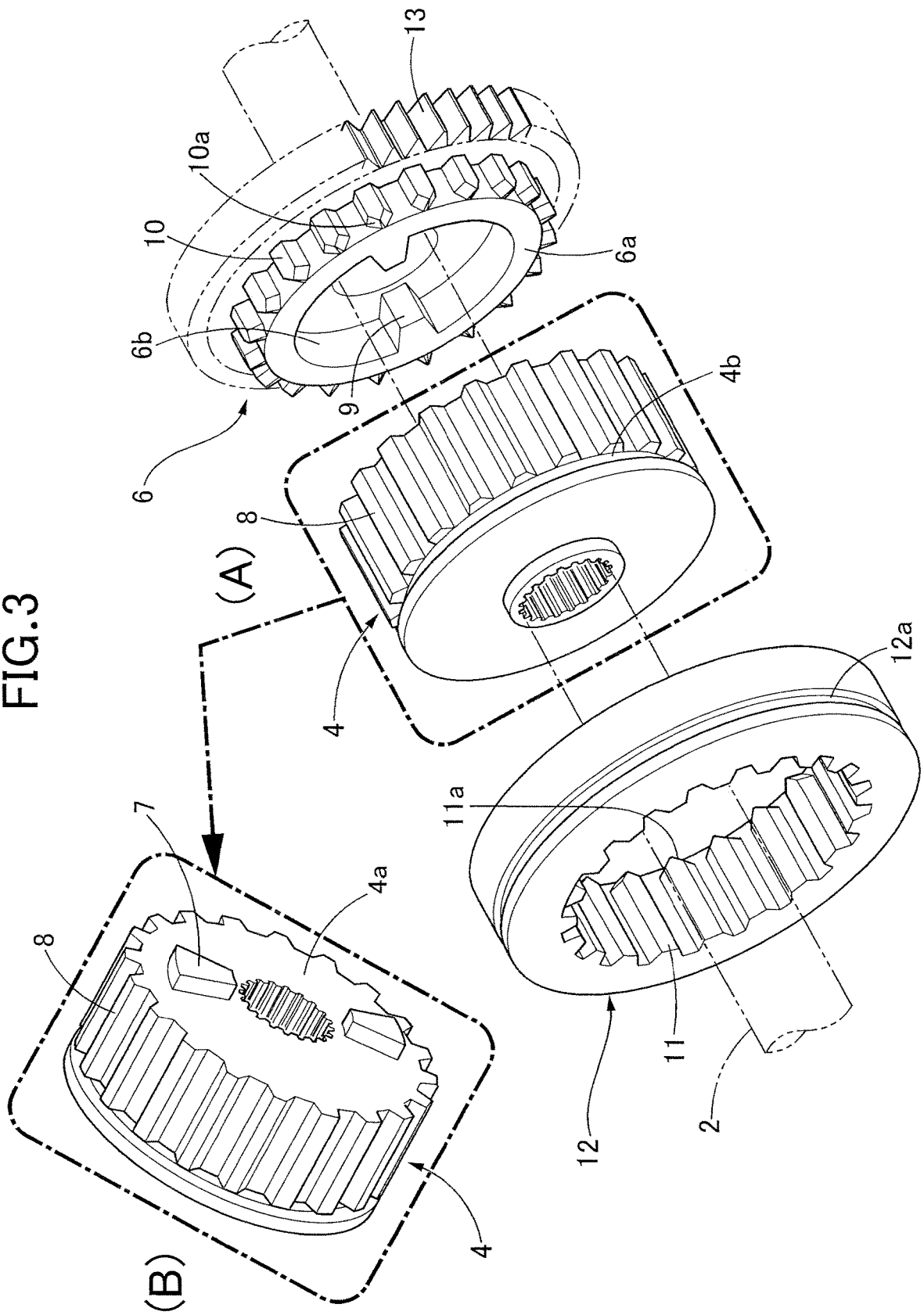
FIG. 3 (A) is an exploded perspective view of the engagement-type clutch mechanism of FIG. 1, and FIG. 3 (B) is a perspective view of a first power transmission member 4 of FIG. 3 (A) when viewed from the opposite direction. (first embodiment)

As shown in FIGS. 3 (A) and (B), the first and second dogs 7 and 9 each have two teeth disposed at intervals of 180 degrees from each other in the peripheral direction on the opposing faces 4a and 6a of the first and second power transmission members 4 and 6; the second dog 9 is formed on an inner face of a recessed portion 6b formed in the opposing face 6a of the second power transmission member 6, and the first dog 7 is formed on the opposing face 4a of the first power transmission member 4 so as to project toward the recessed portion 6b. The first power transmission member 4 is moved toward the second power transmission member 6 side until it abuts against the second power transmission member 6 by driving the fork, which is not illustrated, engaged with the first peripheral groove 4b, the two teeth of the first dog 7 are made to enter the interior of the recessed portion 6b, a side face thereof is then engaged with a side face of the teeth of the second dog 9 by utilizing differential rotation between the first and second power transmission members 4 and 6, and the rotation of the second power transmission member 6 can thus be synchronized with the rotation of the first power transmission member 4. The number of teeth of each of the dogs 7 and 9 is not limited to two, and it is possible to set it to three or higher; the numbers thereof may be different and, when viewed in the peripheral direction of the opposing faces 4a and 6a of the first and second power transmission members 4 and 6, the ratio of the length of a portion between each of the first and second dogs 7 and 9 relative to the width thereof is set larger than the ratio of the length of a portion between the teeth of each of the first and second splines 8 and 10 relative to the tooth thickness.

With regard to the first and second splines 8 and 10 and the to-be-engaged spline 11, the numbers of teeth are all set to be the same and are set to be an integer multiple of the number of teeth of the first and second dogs 7 and 9. This enables the first and second splines 8 and 10 to be engaged with the to-be-engaged spline 11 regardless of the combination in which the teeth of the first and second dogs 7 and 9 are engaged. Chamfers 10a and 11a are given to faces, opposing in the axial direction, of the teeth of the second spline 10 and the to-be-engaged spline 11 respectively, the chamfers 10a and 11a facilitating engagement of the two splines 10 and 11.

Because of this, after the rotation of the second power transmission member 6 is synchronized with the rotation of the first power transmission member 6 due to movement of the first power transmission member 4, merely moving the sleeve 12 toward the second power transmission member 6 side by driving the fork, which is not illustrated, engaged with the second peripheral groove 12a enables the teeth of the to-be-engaged spline 11 to be easily engaged with the teeth grooves of the second spline 10.

Due to such a chamfer being given, even if engagement of the to-be-engaged spline 11 and the second spline 10 is started in a state in which the middle position in the peripheral direction of the teeth of the to-be-engaged spline 11 and the middle position in the peripheral direction of the teeth grooves of the second spline 10 are displaced in advance, due to the sleeve 12 and the second power transmission member 6 undergoing relative rotation along the chamfer the middle positions thereof can be made to coincide with each other at a stage at which engagement of the two splines is completed. In the present embodiment, the arrangement is such that by displacing in advance the middle position of the teeth of the to-be-engaged spline 11 and the middle position of the teeth grooves of the second spline 10 in the peripheral direction at a synchronized position for the first and second power transmission members 4 and 6 where the first and second dogs 7 and 9 engage with each other (that is, displacing a phase at which the first spline 8 and the second spline 10 are linked to each other via the to-be-engaged spline 11 from a phase at which the first dog and the second dog are engaged), the sleeve 12 and the second power transmission member 6 are rotated relative to each other along the chamfer at a stage at which the teeth of the to-be-engaged spline 11 and the teeth grooves of the second spline 10 are engaged with each other, thereby placing the first dog 7 and the second dog 9 apart from each other in a state in which the first spline 8 and the second spline 10 are linked.

In order to increase the amount via which the sleeve 12 and the second power transmission member 6 undergo relative rotation in the peripheral direction, the amount of chamfer of the teeth of the to-be-engaged spline 11 and the second spline 10 can be made different between one side and the other side in the peripheral direction of the two splines 10 and 11. The mechanism for displacing the phase at which the first spline 8 and the second spline 10 are linked via the to-be-engaged spline 11 from the phase at which the first dog and the second dog are engaged is not limited to the mechanism in which a chamfer is used as above.

The operation of the engagement-type clutch mechanism of the present embodiment is now explained by reference to FIG. 4.

Figure 4:
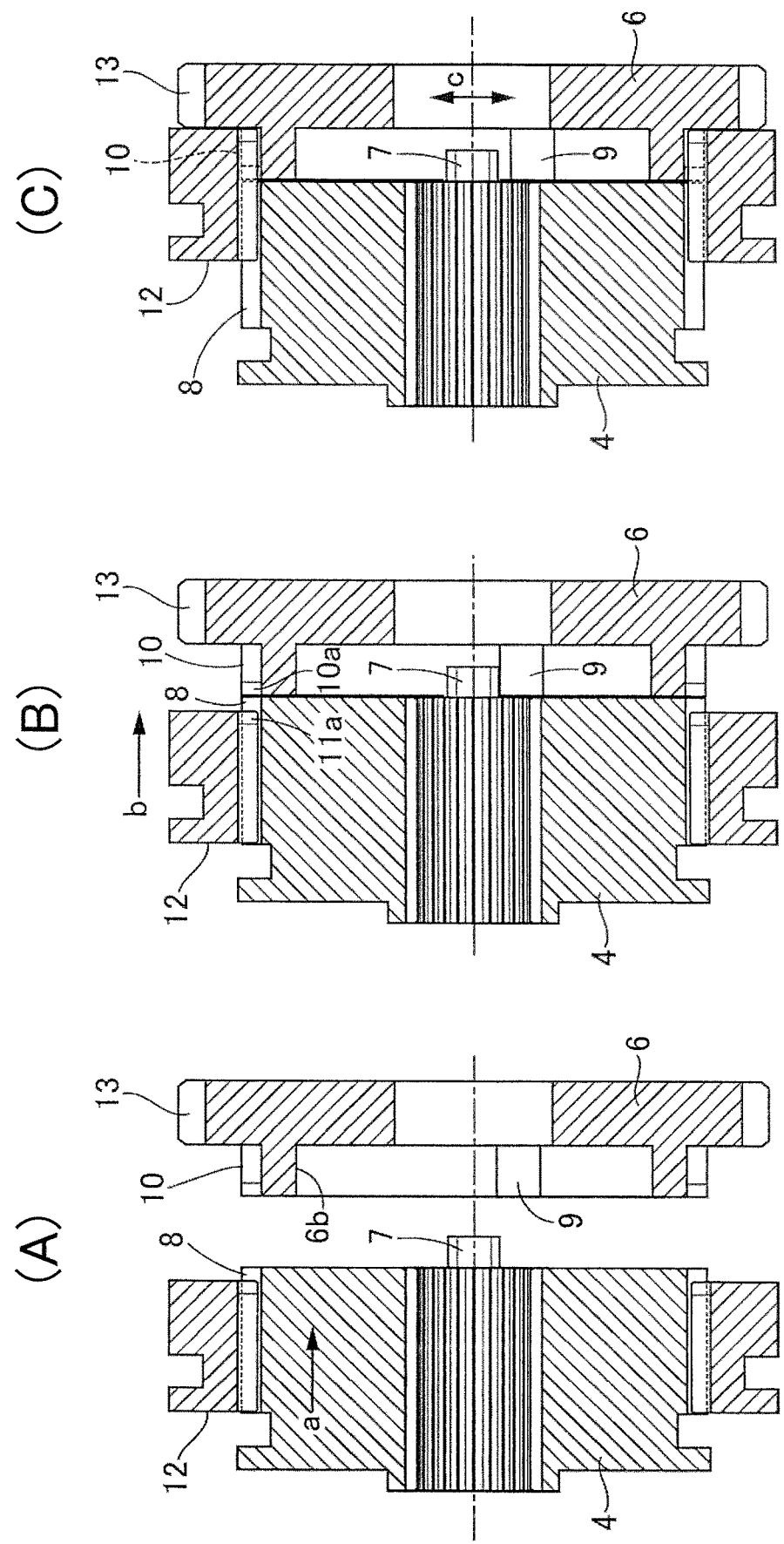
FIG. 4 (A) to FIG. 4 (C) are diagrams for explaining the operation of the engagement-type clutch mechanism of FIG. 1. (first embodiment)

FIGS. 4 (A) to (C) are vertical sectional views when the engagement-type clutch mechanism of FIG. 1 is viewed from a direction displaced in the peripheral direction by 90 degrees from FIG. 2, the rotating shaft 2, the spline 3, and the bearing 5 being omitted.

FIG. 4 (A) shows a non-connected state in which the first power transmission member 4 and the second power transmission member 6 are not connected, and in order to shift the engagement-type clutch mechanism in this state to a connected state, the first power transmission member 4 is first moved toward the second power transmission member 6 side by means of a fork, which is not illustrated, as shown by arrow a, the face 4a thereof opposing the second power transmission member 6 is abutted against the opposing face 6a of the second power transmission member 6, and the first dog 7 is made to enter the interior of the recessed portion 6b.

In this process, since the gap between the first dogs 7 and 7 and the gap between the second dogs 9 and 9 in the peripheral direction are sufficiently larger than the tooth thickness of each of the dogs 7 and 9, the first dog 7 can easily be made to enter the interior of the recessed portion 6b.

In this state, since differential rotation is present between the first and second power transmission members 4 and 6, when the first dog 7 enters the interior of the recessed portion 6b, the side face of the first dog 7 engages with the side face of the second dog 9 as shown in FIG. 4 (B), and due to this engagement the first and second power transmission members 4 and 6 rotate synchronously.

Due to the first and second power transmission members 4 and 6 rotating synchronously, relative rotation of the sleeve 12 and the second power transmission member 6 stops, as a result the teeth of the to-be-engaged spline 11 can be engaged smoothly with the teeth grooves of the second spline 10 and, therefore, moving the sleeve 12 toward the second power transmission member 6 side as shown by arrow b enables the teeth of the to-be-engaged spline 11 to be engaged with the teeth grooves of the second spline 10 as shown in FIG. 4 (C). As a result, the first spline 8 of the first power transmission member 4 communicating with the rotating shaft 2 is linked to the second spline 10 of the second power transmission member 6 via the to-be-engaged spline 11 of the sleeve 12 disposed on the outer periphery thereof, the power of the rotating shaft 2 is transmitted to the outside via the outer teeth 13 of the second power transmission member 6, and the engagement-type clutch mechanism thus shifts to a connected state.

In this process, in the present embodiment, since the faces, opposing in the axial direction, of the teeth of the second spline 10 and the to-be-engaged spline 11 are machined with the chamfers 10a and 11a, and the middle position of the teeth of the to-be-engaged spline 11 and the middle position of the teeth grooves of the second spline 10 are displaced in advance in the peripheral direction at the position in which the first power transmission member 4 and the second power transmission member 6 are synchronized due to the first and second dogs 7 and 9 engaging with each other, it is possible, by spacing the first dog 7 and the second dog 9 as shown by arrow c in FIG. 4 (C) at a stage when engagement of the to-be-engaged spline 11 and the second spline 10 is finished, to prevent the power between the first and second power transmission members 4 and 6 from being transmitted to the first and second dogs 7 and 9.

The operation of this embodiment is now explained.

In the present embodiment, since the two teeth of each of the first and second dogs 7 and 9 are disposed at intervals of 180 degrees from each other in the peripheral direction on the opposing faces 4a and 6a of the first and second power transmission members 4 and 6, and the gap between the teeth is sufficiently larger than the tooth thickness of the teeth, the first dog 7 easily engages with the second dog 9, and the rotation of the second power transmission member 6 can easily be synchronized with the rotation of the first power transmission member 4. Furthermore, since after the rotations of the first and second power transmission members 4 and 6 are synchronized, moving the sleeve 12 disposed on the outer periphery of the first power transmission member 4 smoothly toward the second power transmission member 6 side enables the to-be-engaged spline 11 of the sleeve 12 to be engaged with the second spline 10 of the second power transmission member 6, the first spline and the second spline can be linked smoothly via the to-be-engaged spline due to the movement of the sleeve, and smooth meshing of the engagement-type clutch mechanism can be obtained.

In this process, since the faces, opposing in the axial direction, of the teeth of the second spline 10 and the to-be-engaged spline 11 are machined with the chamfers 10a and 11a respectively, the second spline and the to-be-engaged spline can be linked more smoothly.

Furthermore, since the first and second dogs 7 and 9, which are used for synchronization, and the splines 8, 10, and 11, which are used for power transmission, are provided at different positions from each other, when designing them the placement thereof does not impose any restrictions on one another, thus enhancing the degree of freedom in design.

Moreover, since the first and second splines 8 and 10 and the to-be-engaged spline 11 have their teeth formed into simple shapes without irregularities, it is unnecessary to form teeth with a complicated shape such as those with full depth teeth and stub teeth or with front teeth and rear teeth, and the production thereof is easy.

Furthermore, since when the first spline 8 and the second spline 10 are linked via the to-be-engaged spline 11, the first dog 7 and the second dog 9 in the abutted state can be spaced from each other so that the power between the first and second power transmission members 4 and 6 is not transmitted to the first and second dogs 7 and 9, it is unnecessary to particularly enhance the strength of the first and second dogs 7 and 9, the degree of freedom in design can be enhanced, and the production cost can be reduced. Moreover, when the sleeve 12 is moved away from the second power transmission member 6 to thus release the link between the first and second power transmission members 4 and 6, since the first and second dogs 7 and 9 do not come into sliding contact with each other, it is also possible to enhance the responsiveness at the time of release. Such a mechanism that can release the link between the first and second dogs 7 and 9 can be arranged simply merely by machining the chamfers 10a and 11a on the faces, opposing in the axial direction, of the teeth of the second spline 10 and the to-be-engaged spline 11 and displacing in advance in the peripheral direction the middle position of the teeth of the to-be-engaged spline 11 and the middle position of the teeth grooves of the second spline 10 at the synchronization position for the first power transmission member 4 and the second power transmission member 6 at which the first and second dogs 7 and 9 are engaged with each other, and it is unnecessary to specially add an arrangement for such a mechanism.

Furthermore, since the recessed portion 6b is formed in the face 6a of the second power transmission member 6 opposing the first power transmission member 4, the second dog 9 is formed on the inner face of the recessed portion 6b, and the first dog 7 is formed on the face 4a of the first power transmission member 4 opposing the second power transmission member 6 so as to project toward the recessed portion 6b side, the first and second dogs 7 and 9 are engaged within the recessed portion 6b, thus enabling the dimension of the engagement-type clutch mechanism 1 in the axis L direction to be reduced. Moreover, since the second dog 9 is formed within the recessed portion 6b and does not project outward, the opposing faces 4a and 6a of the first and second power transmission members 4 and 6 can be disposed closer to each other, the distance of movement of the sleeve 12 after synchronization can be decreased, and the time taken for connecting and disconnecting the engagement-type clutch mechanism 1 can be reduced.

Furthermore, since the first power transmission member 4 and the sleeve 12 can be individually moved in the axis L direction by means of the first and second peripheral grooves 4b and 12a formed in the outer peripheries thereof and the two sets of actuators and forks engaging with the peripheral grooves 4b and 12a thereof, it is possible to carry out control so that the timing with which the first power transmission member 4 is moved toward the second power transmission member 6 side and the rotations of the two are synchronized and the timing with which the sleeve 12 is moved toward the second power transmission member 6 side and the to-be-engaged spline 11 and the second spline 10 are engaged are variously changed and so that the speeds of movement of the first power transmission member 4 and the sleeve 12 are changed according to circumstances.

Because of this, for example, when the first power transmission member 4 is moved toward the second power transmission member 6 side, if the first and second dogs 7 and 9 repel each other and are not able to synchronize well, it is possible to carry out control so that in order to carry out synchronization again the first power transmission member 4 is first moved back and then made to go forward again, and after the first and second dogs 7 and 9 are synchronized the sleeve 12 is moved. If after the first spline 8 and the second spline 10 are linked via the to-be-engaged spline 11 the first dog 7 and the second dog 9 are spaced, it is possible, by moving back only the first power transmission member 4 while the to-be-engaged spline 11 is being linked, to move back only the first dog 7 in advance, and a subsequent operation at the time of releasing the engagement-type clutch mechanism 1 can be carried out quickly by merely moving the sleeve 12.

One embodiment of the present invention is explained above, but the present invention is not limited to the above embodiment, and the present invention may be modified in a variety of ways as long as the modifications do not depart from the spirit and scope thereof.

For example, in the engagement-type clutch mechanism of the present embodiment, the power transmitted from a power source, which is not illustrated, to the rotating shaft 2 is transmitted disconnectably/connectably from the second power transmission member 6 to the outer teeth 13, but the power transmitted from a power source, which is not illustrated, to the outer teeth 13 can be transmitted disconnectably/connectably from the second power transmission member 6 to the rotating shaft 2.

Furthermore, the recessed portion formed in the dog may be provided in the opposing face 4a of the first power transmission member 4, or without providing a recessed portion the first and second dogs 7 and 9 may be made to project directly from the opposing faces 4a and 6a of the first and second power transmission members 4 and 6.

Moreover, instead of providing a recessed portion in one of the opposing faces 4a and 6a, a plurality of long grooves extending in the peripheral direction may be provided in one of the opposing faces 4a and 6a, and a portion of the one of the opposing faces 4a and 6a sandwiched by the long grooves may be defined as one of the first and second projecting parts, and the other of the first and second projecting parts projecting toward the long grooves may be formed on the other of the opposing faces 4a and 6a.

Furthermore, in the present embodiment, the arrangement is such that in the stage at which the teeth of the to-be-engaged spline 11 and the teeth grooves of the second spline 10 are engaged with each other, the sleeve 12 and the second power transmission member 6 are made to undergo relative rotation along the chamfers, and the first dog 7 and the second dog 9 are spaced in a state in which the first spline 8 and the second spline 10 are linked, but if it is not necessary to space the first dog 7 and the second dog 9 in a state in which the first spline 8 and the second spline 10 are linked, such an arrangement does not need to be employed.

The invention claimed is:
1. An engagement-type clutch mechanism comprising
a first power transmission member supported on a rotating shaft so as to be capable of rotating integrally with the rotating shaft and moving in a direction of an axis of the rotating shaft,
a second power transmission member supported on the rotating shaft adjacently to the first power transmission member so as to be capable of rotating relative to the rotating shaft and incapable of moving in the direction of the axis, a first projecting part provided on a face of the first power transmission member that opposes the second power transmission member, a first spline provided on an outer peripheral face of the first power transmission member, a second projecting part provided on a face of the second power transmission member that opposes the first power transmission member and being capable of engaging with the first projecting part, a second spline provided on an outer peripheral face of the second power transmission member, and a sleeve having on an inner peripheral face a to-be-engaged spline that can engage with each of the first spline and the second spline, and disposed so as to be capable of moving in the direction of the axis, when viewed in a peripheral direction of opposing faces of the first and second power transmission members, a ratio of a length of a portion between the first and second projecting parts to a width thereof being larger than a ratio of a length of a portion between teeth of each of the first and second splines relative to a tooth thickness, movement of the first power transmission member toward the second power transmission member side engaging the first projecting part with the second projecting part and making rotation of the second power transmission member be synchronized with rotation of the first power transmission member, engagement of the sleeve with the synchronized first power transmission member and second power transmission member linking the first spline and the second spline via the to-be-engaged spline, and rotation of one of the rotating shaft and the second power transmission member being transmitted to the other of the rotating shaft and the second power transmission member.

2. The engagement-type clutch mechanism according to claim 1, wherein a phase at which the first spline and the second spline are linked via the to-be-engaged spline and a phase at which the first projecting part and the second projecting part are engaged are different from each other.

3. The engagement-type clutch mechanism according to claim 2, wherein a recessed portion is formed in one of the opposing faces of the first and second power transmission members, one of the first and second projecting parts corresponding to the power transmission member is formed on an inner face of the recessed portion, and the other of the first and second projecting parts is formed on the other of the opposing faces so as to project toward the recessed portion side.

4. The engagement-type clutch mechanism according to claim 3, further comprising a movement control device that can individually move the first power transmission member and the sleeve.

5. The engagement-type clutch mechanism according to claim 2, further comprising a movement control device that can individually move the first power transmission member and the sleeve.

6. The engagement-type clutch mechanism according to claim 1, wherein a recessed portion is formed in one of the opposing faces of the first and second power transmission members, one of the first and second projecting parts corresponding to the power transmission member is formed on an inner face of the recessed portion, and the other of the first and second projecting parts is formed on the other of the opposing faces so as to project toward the recessed portion side.

7. The engagement-type clutch mechanism according to claim 6, further comprising a movement control device that can individually move the first power transmission member and the sleeve.

8. The engagement-type clutch mechanism according to claim 1, further comprising a movement control device that can individually move the first power transmission member and the sleeve.

* * * * *